Sept. 2, 1924.  
J. GOLON  
CORN PLANTER  
Filed May 7, 1923  
1,507,311  
2 Sheets-Sheet 2
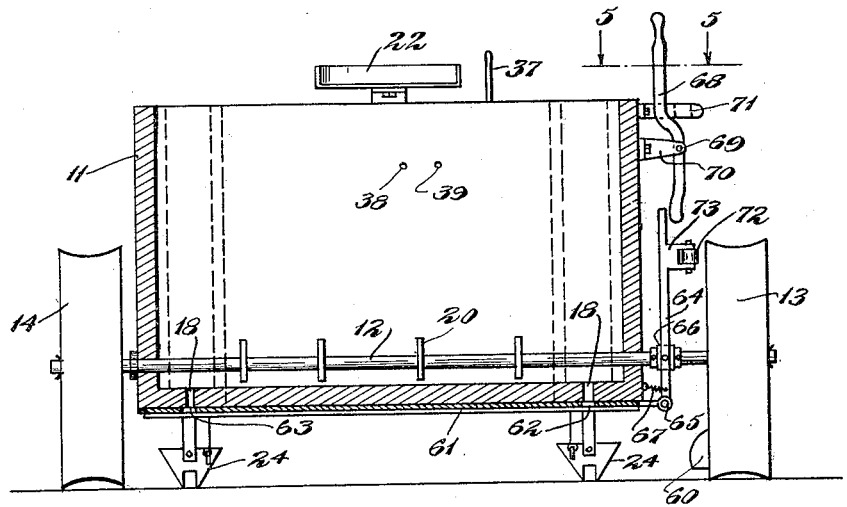
INVENTOR.
Julius Golon
BY
George C. Heinicke
ATTORNEY Patented Sept. 2, 1924.

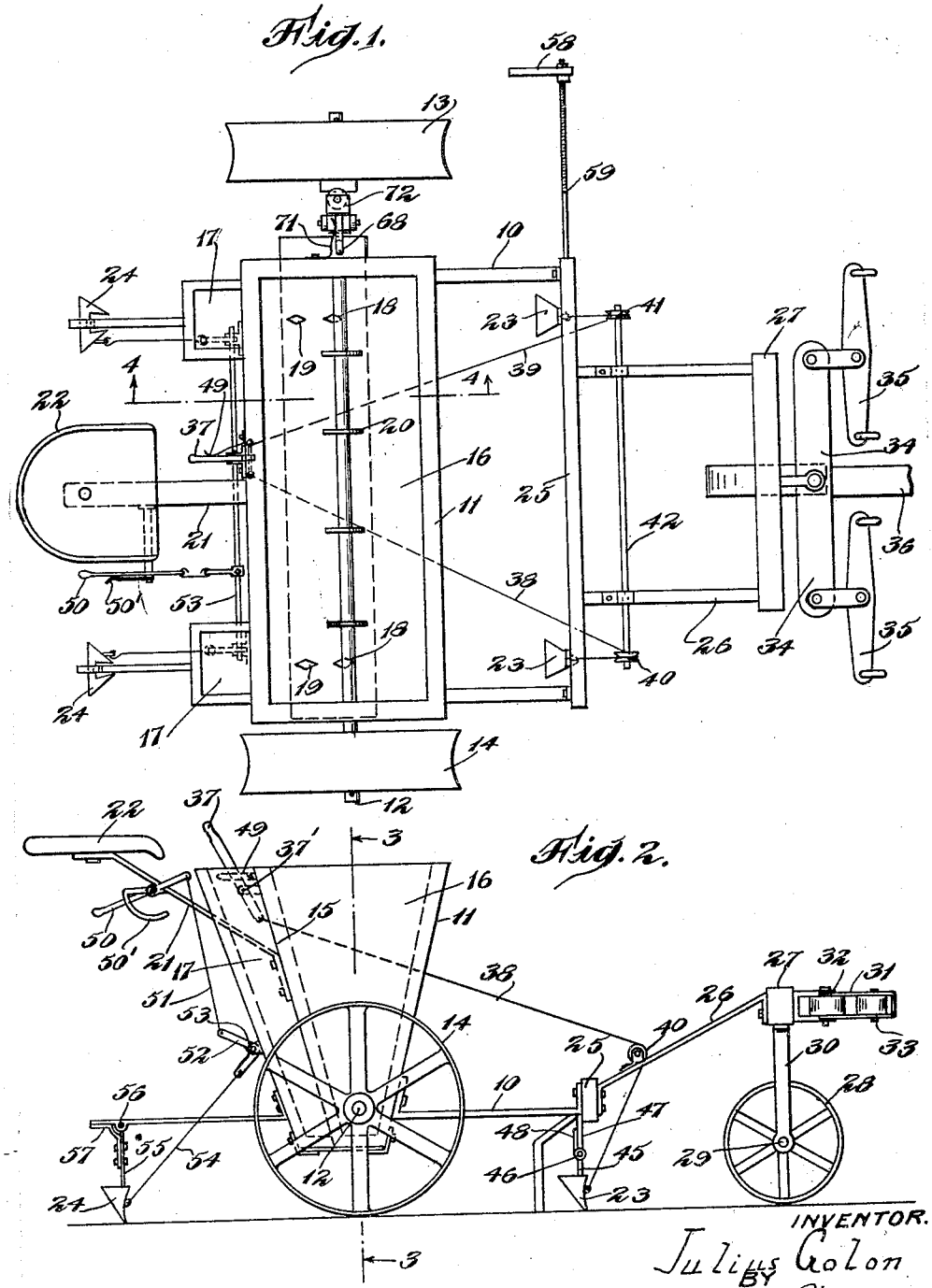

1,507,311

UNITED STATES PATENT OFFICE.

JULIUS GOLON, OF SUFFIELD, CONNECTICUT.

CORN PLANTER.

Application filed May 7, 1923. Serial No. 637,266.

*To all whom it may concern:*

Be it known that I, JULIUS GOLON, a citizen of Poland, residing at Suffield, county of Hartford, and State of Connecticut, have invented certain new and useful Improvements in Corn Planters, of which the following is a specification.

This invention relates to improvements in planters and seeders, particularly corn planters, and it is the principal object of my invention to provide a machine of this character with a fertilizer distributing device and means for controlling the distribution of corn and fertilizer in desired quantities.

Another object of the invention is the provision of furrow openers and closers in front of and in the rear of the machine, and of means for controlling the operations of the same from the seat of the operator.

A further object of the invention is the provision of means for operating the fertilizer and said distributing means from a wheel.

These and other objects of my invention will become more fully apparent as the description thereof proceeds and will then be more specifically pointed out in the appended claim.

In the accompanying drawings forming a material part of this disclosure:

Figure 1 is a top plan view of a corn planter and fertilizer constructed according to the present invention.

Figure 2 is a side view thereof.

Figure 3 is a section on line 3—3 of Fig. 2.

Figure 4 is a section on line 4—4 of Fig. 1, and

Figure 5 is a detail view, partly in section on line 5—5 of Fig. 3.

The planter comprises a frame 10 which carries a hopper-shaped body 11 supported on axle 12 to which the wheels 13 and 14 are attached. A partition wall 15 divides the hopper into a fertilizer compartment 16, and compartments 17 for the corn to be planted, and the common bottom for both compartments is provided with a plurality of openings 18 for the distribution of the fertilizer, and 19 for the distribution of the seed corn. The axle 12 carries within the fertilizer compartment a plurality of stirring discs 20, for agitating the fertilizer during the travel of the machine, while a bracket 21 is attached with its inner end to the wall 15 and carries at its upper end a seat 22 for the operator.

The frame 10 carries at its front a plurality of furrow openers or plow shares 23, while it carries in rear of the hopper a plurality of furrow closing devices 24 of any well known construction.

To the front cross beam 25 of the frame 10, a bracket 26 is attached to the front end of which a cross beam 27 is secured supported by a wheel 28 on axle 29 journaled in a hanger 30 attached to the underside of beam 27. To the front face of this beam a bracket or housing 31 is attached for the rollers 32 and 33 of a double tree 34, to which the swingle trees 35 are secured for the attachment of the traces of the draft animals, to both sides of a pole 36.

The furrow diggers or plow shares 23 are controlled by the operator by means of a lever 37 in front of seat 22 pivoted intermediate its ends as at 37'.

The lower end of said lever carries a cross piece to which the cables 38, 39 are attached, which are guided over rollers or pulleys 40, 41, on a rod 42 journaled in bearings or guides 43, 44, while the ends of these cables are attached to the front of plow shares 23 which are carried by rods 45 rotatably secured as at 46 to brackets 47 on frame 10, a rearward movement of shares 23 is prevented by stops 28. The lever 37 can be locked in any of its adjusted positions by a locking device for instance a spring, generally indicated at 49 of any of the well known construction.

To the bracket 21 is pivotally secured between its ends below seat 22, a lever 50, to the outer end of which a cable 51 is attached, the other end of which is secured to the end of one arm of a bell crank lever 52 pivotally secured to a rod 53 journaled in brackets on the outer wall of the hopper, while a cable 54 is attached at one end to the other arm of said bell crank lever, and at its other end to the front face of the furrow closer 24 which is exchangeably attached to a depending bar 55 pivotally secured as at 56 to frame 10, while a stop 57 limits the rearward motion of the furrow closer.

A locking spring 50' serves to hold lever 50 in any of its adjusted positions.

A furrow marker 58 is attached to the end of a threaded rod 59 laterally projecting from the frame 10.

An abutment 60 is provided at the inner face of wheel 13 adapted to engage a roller 72 journaled between the arms of a bracket 73 integral with a lever 64 and provided near its upper end. The end of a plate 61 sliding within a suitable channel of the hopper bottom projects laterally therefrom, and plate 61 is provided with pairwise arranged openings 62 and 63 adapted to be brought successively into alignment with openings 18 and 19.

To the outer end of plate 61 is pivotally secured as at 65, the vertical lever 64 having its forked ends 66 pivotally attached to shaft 12.

A spring 67 is attached with one end to bar 64 near its lower end, and with its other end to the outer wall of the hopper 11.

The upper end of lever 64 is adapted to be engaged by the lower end of a handle lever 68 pivotally secured intermediate its ends as at 69 to a bracket 70 attached to the hopper wall while a locking device, as for instance as shown, a spring 71 allows a locking of lever 68 in any of its adjusted positions.

The device operates as follows:

During the travel of the planter over the ground, the furrow openers will open a furrow in front of the machine, into which fertilizer and corn seeds are deposited, and the periodical engagement of the abutment 60 with roller 72 will press the upper end of lever 64 backward so that its lower end will pull plate 61 in one direction to register openings 62 and 63 in said plate with the openings 18 and 19, while upon disengagement of the abutment 60 from roller 72, the lever 64 will be returned by spring 67 into its original position illustrated in Fig. 3 in which openings 62 and 63 of plate 61 move beyond openings 18 and 19 in order to prevent a deposition of fertilizer and seeds.

If it is desired to stop the discharge of fertilizer and seeds altogether, if for instance the machine is traveling over a road, the lever 68 is operated to engage with its lower end the upper end of lever 64 which will draw plate 61 outwardly and bring openings 62 and 63 out of alignment with openings 18 and 19. The regulation of the plow shares 23 and the furrow closers 24 is effected by a corresponding manipulation of lever 37 and cables 38, 39 or levers 50 and cables 54. The distance between two furrows can be regulated by the proper manipulation of the furrow marker 58 in an evident manner.

Having thus described my invention what I claim is:

In a corn planter, hoppers for the seed corn and fertilizer, each of said hoppers formed with discharge openings in the bottom, guides secured to the hoppers and depending below the bottom, a plate slidable in said guides in contact with the lower surface of the bottom and formed with openings to register with the discharge openings in the hopper bottoms, a lever connected at one end to said plate and pivotally supported upon the ground wheel axle of the planter, said lever having a lateral offset adapted to be engaged by a projection on one of the ground wheels to move the lever at each revolution of the wheel and thereby move the plate to cause registry of the openings in said plate with the openings in the hopper bottom, a hand lever pivotally supported upon one of the hoppers and having its lower free end arranged adjacent the upper end of the first mentioned lever, whereby operation of the hand lever will move the first mentioned lever to a position to hold the lateral projection beyond the influence of the ground wheel, and means whereby the hand lever may be temporarily held in operative position.

In testimony whereof I have affixed my signature.

JULIUS GOLON.